Patented Nov. 16, 1943

2,334,408

UNITED STATES PATENT OFFICE 2,334,408

PROCESS FOR MAKING CHLORINATED PHENOL - ALDEHYDE CONDENSATION PRODUCTS

William S. Gump, Montclair, and Max Luthy, Ridgewood, N. J., assignors to Burton T. Bush, Inc., New York, N. Y., a corporation of New Jersey No Drawing. Application July 26, 1941, Serial No. 404,154

4 Claims. (Cl. 260—619)

The present invention relates to a process for making condensation products from para-chlorinated phenols and formaldehyde.

More especially, this invention relates to a process for making chlorinated 2,2'-dihydroxy diphenyl methanes by reacting a phenol, selected from the group consisting of para-chloro phenol and 2,4-dichloro phenol, with formaldehyde in the presence of sulfuric acid.

A process for making the aforementioned products has been described in United States Patent 1,707,181. The process of this patent possesses certain disadvantages. For example, appreciable amounts of by-products are formed during the condensation reaction. Also, the yields of the 2,2'-dihydroxy chlorinated diphenyl methanes are not satisfactory and the cost of making such products is relatively high. Moreover, much difficulty is encountered in isolating the 2,2'-dihydroxy chlorinated diphenyl methanes in substantially pure form.

An object of this invention is an improved process for making 2,2'-dihydroxy di- and tetrachlorinated diphenyl methanes by reacting para-chloro phenol or 2,4-dichloro phenol, respectively, with formaldehyde in the presence of sulfuric acid.

A specific object of this invention is the provision of such a process for making the aforementioned 2,2'-dihydroxy chlorinated diphenyl methanes that the amounts of undesirable by-products formed during the process are materially less than those obtained in the practice of the prior art process. Examples of such by-products are resins and sulfonated materials.

A further object is the provision of a process in which the desired condensation reaction proceeds at a satisfactory rate.

A still further object is a process which enables one to obtain the desired condensation products in higher yields and at lower costs than were previously attained.

Another object is a process which yields the desired condensation products in such a state that they may be isolated and purified without difficulty.

Other objects will be apparent from a reading of the following description.

The foregoing objects are accomplished by this invention which comprises the process of reacting para-chloro phenol or 2,4-dichloro phenol with formaldehyde, or a formaldehyde-yielding substance in the presence of sulfuric acid at temperatures between —10° and +5° C., the reaction taking place, advantageously, in the presence of a liquid which is inert under the conditions of the reaction and which is further characterized by being a solvent for the chlorinated phenol employed and being miscible with sulfuric acid.

The 2,2'-dihydroxy chlorinated diphenyl methane which is formed by the reaction may be isolated in known manner or by a novel method hereinafter described. An example of a known way to isolate the desired condensation product is that wherein the products of reaction are quenched in ice or ice water and the resulting precipitate is washed acid-free; the washed precipitate is then dried and recrystallized from a solvent such as benzene or toluene, and finally, the recrystallized product is dried to remove substantially all of the solvent therefrom.

As already mentioned, the phenolic reactants which may be employed in this invention are para-chloro phenol and 2,4-dichloro phenol. As indicating the specificity and unexpected nature of the present process, it may be mentioned that para-bromo phenol, which is closely related chemically to para-chloro phenol, does not yield satisfactory results. The yield of 2,2'-dihydroxy dibromo diphenyl methane formed by the present process is materially lower than in the case of the corresponding chlorine-containing compound. Also, considerable difficulty is entailed in obtaining the above-named bromine-containing condensation product in substantially pure form.

The aldehydic materials which are included in this invention are formaldehyde and materials capable of yielding formaldehyde under the conditions of the reaction. As specific examples of aldehydic materials which have been employed may be mentioned, for example, aqueous solutions of formaldehyde (e. g. of 35 to 40% formaldehyde content) and paraformaldehyde.

Sulfuric acid solutions of various acid concentrations may be employed. Excellent results have been obtained when the initial $H_2SO_4$ concentration of the sulfuric acid solution employed is about 90 to 95%, or even somewhat higher. Satisfactory results, however, can be obtained when sulfuric acid of a concentration as low as approximately 85% is used.

The inert liquids in which the reaction may be conducted are the aliphatic water-miscible alcohols, for example methyl alcohol, ethyl alcohol, isopropyl alcohol, etc. Such liquids are inert under the conditions of the reaction, and are further characterized by being solvents for the chlorinated phenols employed and by being miscible with sulfuric acid. By way of indicating the advantage of employing liquids possessing all of the properties just noted, it may be stated that when ligroin is employed, the desired condensation reaction does not proceed in any measurable degree. Ligroin does not possess the property of being miscible with sulfuric acid, but it is inert under the reaction conditions and is a solvent for the chlorinated phenols employed.

The amounts of reactants and the other ingredients employed in the present process may be varied over wide limits. Good results are obtained when 2 mols of the phenol per each mol equivalent of formaldehyde are used. Amounts of the phenol between 1.8 to 2.5 mols per mol of formaldehyde give satisfactory results. Larger amounts of the phenol, although they may be used, are not recommended because of the necessity of removing the unreacted phenol from the condensation products after the termination of the reaction.

In calculating the amount of formaldehyde used when aqueous formaldehyde is employed as the aldehydic material, only the actual $CH_2O$ content of the aldehyde solution is considered. For example, if 75 grams of a 40% formaldehyde solution are used, the actual $CH_2O$ content is 30 grams. When formaldehyde-yielding substances are employed as the aldehydic material, the amount of $CH_2O$ formed during the reaction is taken as the amount of formaldehyde.

The amount of sulfuric acid solution which may be used in the present process varies. It is preferred to use sulfuric acid in an amount not substantially less than four times the weight of the phenol employed. Advantageously, sulfuric acid in an amount equal to six times the weight of the phenol employed, may be used. It suffices that there is a sufficient amount of sulfuric acid present to enable one to obtain a workable reaction mixture, that is, one which can be stirred satisfactorily in stirring equipment usually employed in such reactions. Any amount of sulfuric acid greater than that required to just give a workable mixture may be employed, economic considerations primarily dictating the actual amount to use.

The liquid, for example, methyl alcohol, used in the reaction mixture can also vary in amount. At least enough liquid should be used so as to dissolve the phenol employed. It is advisable not to use so much of such liquid that the concentration of the sulfuric acid, after the completion of the reaction, is below approximately 70%, calculated on the basis of the total weight of sulfuric acid, water and solvent present after the completion of the reaction. Good results have been obtained when liquids such as methyl alcohol are used in an amount between 20 to 30% of the weight of phenol employed, but larger amounts of such liquids may be employed.

The condensation reaction may be conducted for a period of about 6 to 8 hours, or longer, in order to give good yields.

It has been found that the aldehydic material used in the process of this invention is advantageously introduced slowly into the reaction chamber. Otherwise, the yield of the desired condensation products is adversely affected and difficulty in isolating such products in substantially pure form is encountered. Moreover, if the aldehydic material is added too rapidly, relatively large amounts of undesirable by-products such as resins are formed.

In general, it has been found that satisfactory results are obtained and the aforementioned undesirable consequences of the too-rapid addition of the aldehydic material are obviated if the addition of such aldehydic material is effected during a period of about 2–5 hours. A longer period may be used with no concomitant adverse results but a period substantially less than 2 hours is not recommended because the aforementioned undesirable consequences become evident if such a period is employed.

When para-chloro phenol is used, the temperature at which the reaction is conducted is advantageously between —10° C. and 0° C. If temperatures a few degrees (5 or more) above 0° C. are employed, the formation of relatively large amounts of undesirable by-products occurs. Moreover, considerable difficulty in isolating 2,2-dihydroxy-5,5'-dichloro diphenyl methane in substantially pure form is encountered when the condensation reaction is conducted above 5° C. Temperatures under about —10° C. are not suitable because the condensation reaction proceeds slowly at such temperatures. Similarly, the optimum range for conducting the condensation reaction when 2,4-dichloro phenol is used is 0° C. to 5° C., although temperatures as low as —10° C. yield satisfactory results.

The reactants and other ingredients used in the present process are advantageously added in a certain order; otherwise, the aforementioned objects of the present invention are not all attained.

A phenol-liquid (e. g. $CH_3OH$)-sulfuric acid mixture is first made, the phenol being introduced in solution with the liquid employed. The aldehydic material, with or without the liquid (e. g. $CH_3OH$) is then added to the phenol-liquid-acid mixture. When solid aldehydic materials, e. g. paraformaldehyde, are used, one employs them in dispersion with the inert liquid. When liquid aldehydic materials, e. g. aqueous formaldehyde solution are used, such inert liquids may or may not be employed.

As hereinbefore mentioned, a novel method of working up the products of reaction also forms a feature of the present invention. In this method, herein termed the "solvent extraction method," the reaction products are diluted with ice or cold water and the resulting mixture is treated with a mixture of liquids, such as toluene and isopropyl ether. Such a solvent mixture, aided by the presence of the previously-defined "inert liquids," such as methyl alcohol, dissolves substantially all of the 2,2'-dihydroxy chlorinated diphenyl methane present and there are obtained 2 layers: a solvent layer, containing the desired condensation products; and an acid layer. The acid layer is separated, the solvent phase is washed acid-free, and most of the ether then is distilled off from the solvent phase remaining after removal of the acid layer. After the residue from the ether distillation is cooled, an appreciable amount of the desired condensation product crystallizes from the solution, in pure form. The mother liquor is concentrated and cooled, whereupon more of the substantially pure condensation product crystallizes out of solution.

Enough ice or cold water is added to the reaction products to dilute the sulfuric acid to a strength such that substantially no isopropyl ether (or other such solvent as herein defined) is soluble in the acid solution. It has been found that when the $H_2SO_4$ concentration in the acid solution is approximately 40% by weight, or lower, this purpose is achieved. Any isopropyl ether (or other such solvent as herein defined) which dissolves in the acid solution, carries along with it some of the desired condensation product and the yield of the latter is correspondingly affected adversely.

The particular advantages of the foregoing method of working up the condensation products of this invention are that there is no need for filtering a mass containing sulfuric acid and that no intermediate drying step is required. As is well known, special acid-resistant filtering apparatus is required to filter a mass containing a large amount of sulfuric acid solution. The elimination of the intermediate drying step results in lower costs. This may be appreciated when it is considered that the intermediate drying step used in the known method of working up the condensation products involves the elimination of the water. Such elimination is difficult and relatively costly. The only drying step used in the novel extraction method entails the elimination of easily removable solvents such as benzene or toluene.

The solvent mixture used in the "solvent extraction method" comprises a mixture of at least two liquids, one liquid or group of liquids in the mixture possessing good solvent properties for the 2,2'-dihydroxy chlorinated diphenyl methanes of this invention, and the other liquid, or group of liquids, possessing such poor solvent properties for such condensation products as will enable the latter to crystallize from such liquids after the liquids having good solvent properties are substantially all removed from the solvent mixture. It is requisite that the liquid or group of liquids possessing good solvent action on the 2,2'-dihydroxy chlorinated diphenyl methanes should have an appreciably lower boiling point or boiling points than the non-solvent liquid or liquids. This is to enable the easy removal of the liquid or liquids having good solvent action from the solvent mixture by atmospheric distillation.

As examples of liquids which may be employed in the aforementioned solvent mixture are isopropyl ether and toluene. The former is a good solvent for the 2,2'-dihydroxy chlorinated diphenyl methanes of this invention and the latter is a poor solvent for such compounds. It has been found that good results are obtained when the total percentage of the liquid or liquids having good solvent action on the condensation products of this invention is between 20 to 50% by weight of the total solvent mixture. Smaller or larger percentage amounts of such liquid or liquids may be used, however, if desired.

The solvent mixture used in the "solvent extraction method" is used in amounts at least 4 times the weight of the phenol used.

The following specific examples indicate how the process of this invention may be practiced. They are for purposes of illustration and are not to be construed as limiting the scope of the invention.

*Example 1*

2,520 grams of sulfuric acid (93% $H_2SO_4$ content) is stirred and cooled to 0° C. A solution of 552 grams of parachloro phenol in 305 grams of methyl alcohol is run into the acid, the temperature being kept below 10° C.

The mixture is cooled to −5° C. and a solution of 170 grams of aqueous formaldehyde solution (37% $CH_2O$ in water) in 332 grams of methyl alcohol is introduced at a more or less uniform rate over a period of 4 hours. The temperature of the reaction mixture is not allowed to rise above 0° C. After all of the formaldehyde-containing solution has been added, the batch is stirred for 3 hours longer at a temperature of −5° C. to 0° C.

Enough ice is then added to the contents of the reaction chamber in order to reduce the sulfuric acid concentration to 70%. 2,2'-dihydroxy-5,5'-dichloro diphenyl methane is extracted from the resulting mixture with a mixture of 1,069 grams of isopropyl ether and 1,575 grams of toluene. Ice is added until the acid concentration is about 30%. The acid layer is removed and the solvent layer is washed acid-free. Most of the isopropyl ether is removed therefrom by atmospheric distillation with a fractionating column, the temperature of the escaping vapors not being permitted to exceed 90° C. From the residue, about 280 grams of pure 2,2'-dihydroxy-5,5'-dichloro diphenyl methane, melting point of 177°–178° C., crystallize. The product is filtered, washed with toluene and dried at about 100° C. By concentrating the mother liquor remaining after the foregoing crystallization and filtration, another 225 grams of substantially pure 2,2'-dihydroxy-5,5'-dichloro diphenyl methane are obtained. This latter crop may be crystallized from toluene in order to convert it into 2,2'-dihydroxy-5,5'-dichloro diphenyl methane of melting point of 177°–178° C.

*Example 2*

Into 180 grams of $H_2SO_4$ solution (93% acid strength) cooled to 0° C. is run, with stirring, a solution of 38 grams of 2,4-dichloro phenol in 18 cubic centimeters of methyl alcohol. Then, at a temperature between 0° C. and 5° C., 9 cubic centimeters of aqueous formaldehyde solution (37% $CH_2O$ strength) are added at a more or less uniform rate over a period of 2 hours. Stirring is continued for 24 hours at a temperature of about 5° C. The mixture is poured on ice, washed acid-free with water and dried at 60° C.

36 grams of a white powder, melting at 163°–165° C. are obtained. Recrystallization of this white powder from 100 grams of toluene gives 31 grams of pure 2,2'-dihydroxy-3,5-3',5'-tetrachloro diphenyl methane. This product comprises fine, white or colorless needles having a melting point of 169°–170° C.

Alternatively, the reaction products, obtained after the foregoing 24 hour stirring step, may be subjected to the novel "solvent extraction method" hereinbefore described and pure 2,2'-dihydroxy-3,5-3',5'-tetrachloro diphenyl methane thereby obtained also.

The term "formaldehyde" is used in the claims to include those products capable of yielding formaldehyde under the conditions of the reaction.

The term "solvent extraction method" is used in the specification and claims to denote the novel method, hereinbefore described, of working up the reaction products in order to isolate and purify the desired condensation products.

The foregoing illustrates the practice of the invention which, however, is not to be limited thereby but is to be construed as broadly as permissible in view of the prior art and limited solely by the appended claims.

What is claimed is:

1. The process of producing 2,2'-dihydroxy-5,5'-dichloro diphenyl methane which comprises gradually adding a formaldehyde-yielding substance over a period of hours to a mixture of para-chloro phenol, sulphuric acid and inert solvent, while maintaining the temperature between —10° C. and 0° C.

2. The process of producing 2,2'-dihydroxy-5,5'-dichloro diphenyl methane which comprises adding formaldehyde over a period not substantially less than about two hours to a mixture of para-chloro phenol and sulfuric acid in a mutual solvent maintained at temperatures between —10° C. and 0° C.

3. The process of producing 2,2'-dihydroxy-5,5'-dichloro diphenyl methane which comprises adding formaldehyde over a period of at least two hours to a mixture of para-chloro phenol, sulfuric acid and methanol maintained between —10° C. and 0° C.

4. The process of producing 2,2'-dihydroxy-5,5'-dichloro diphenyl methane which comprises the steps of adding a solution of para-chloro phenol in methanol to sulfuric acid, adding formaldehyde thereto over a period of hours while maintaining the temperature between —10° C. and 0° C., extracting 2,2'-dihydroxy-5,5'-dichloro diphenyl methane therefrom with a mixed organic solvent partially distilling said mixed solvent, and crystallizing substantially pure 2,2'-dihydroxy-5,5'dichloro diphenyl methane from the undistilled residue thereof.

WILLIAM S. GUMP.
MAX LUTHY.

CERTIFICATE OF CORRECTION.

Patent No. 2,334,408. November 16, 1943.

WILLIAM S. GUMP, ET AL.

It is hereby certified that error appears in the printed specification of the above numbered patent requiring correction as follows: Page 2, second column, line 16, for "2,2-dihydroxy-5,5'-dichloro" read --2,2'-dihydroxy-5,5'-dichloro--; page 4, second column, line 9, claim 4, after "solvent" insert a comma; and that the said Letters Patent should be read with this correction therein that the same may conform to the record of the case in the Patent Office.

Signed and sealed this 18th day of January, A. D. 1944.

(Seal)

Henry Van Arsdale,
Acting Commissioner of Patents.